C. R. SAUNDERS.
LEVER LOCK.
APPLICATION FILED DEC. 23, 1909.
1,138,795.
Patented May 11, 1915.
2 SHEETS—SHEET 2.
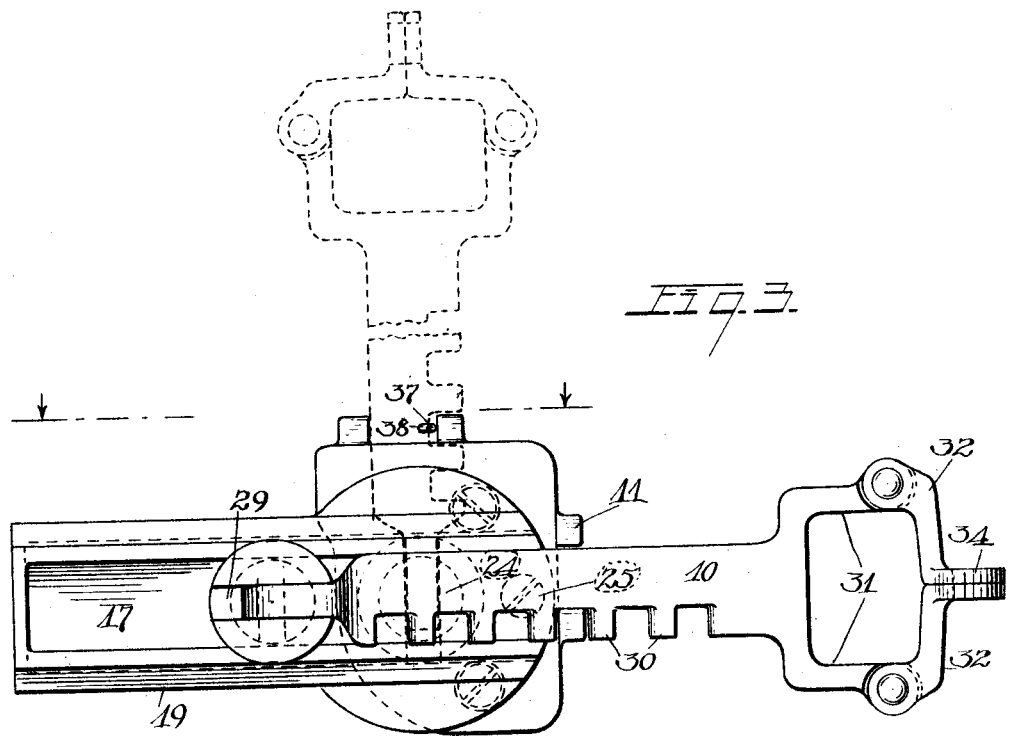
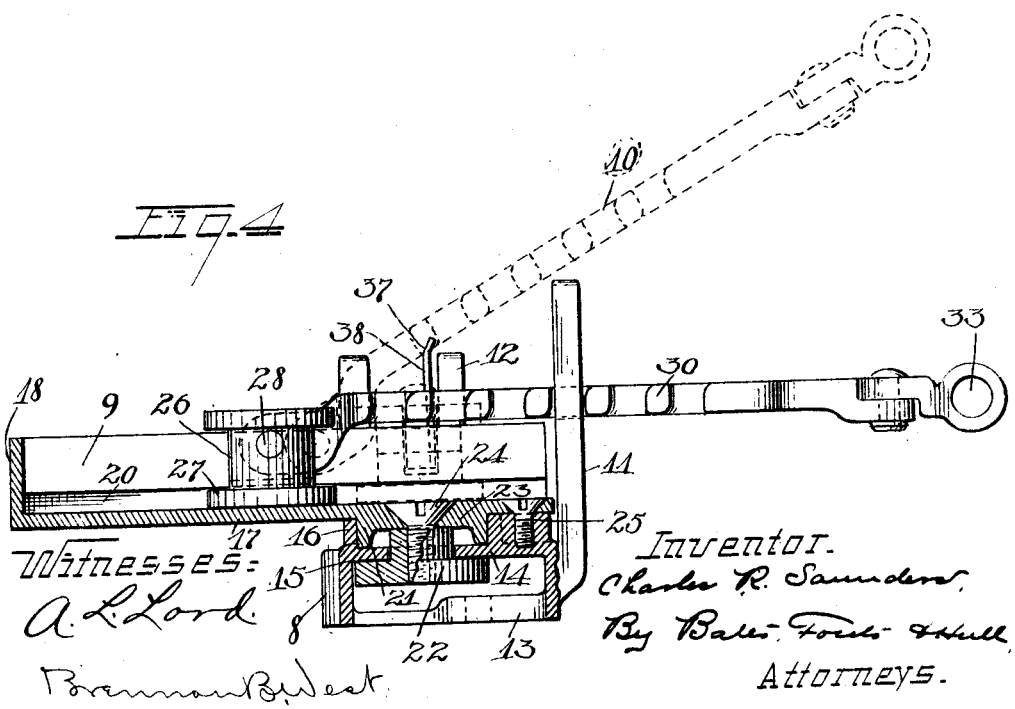

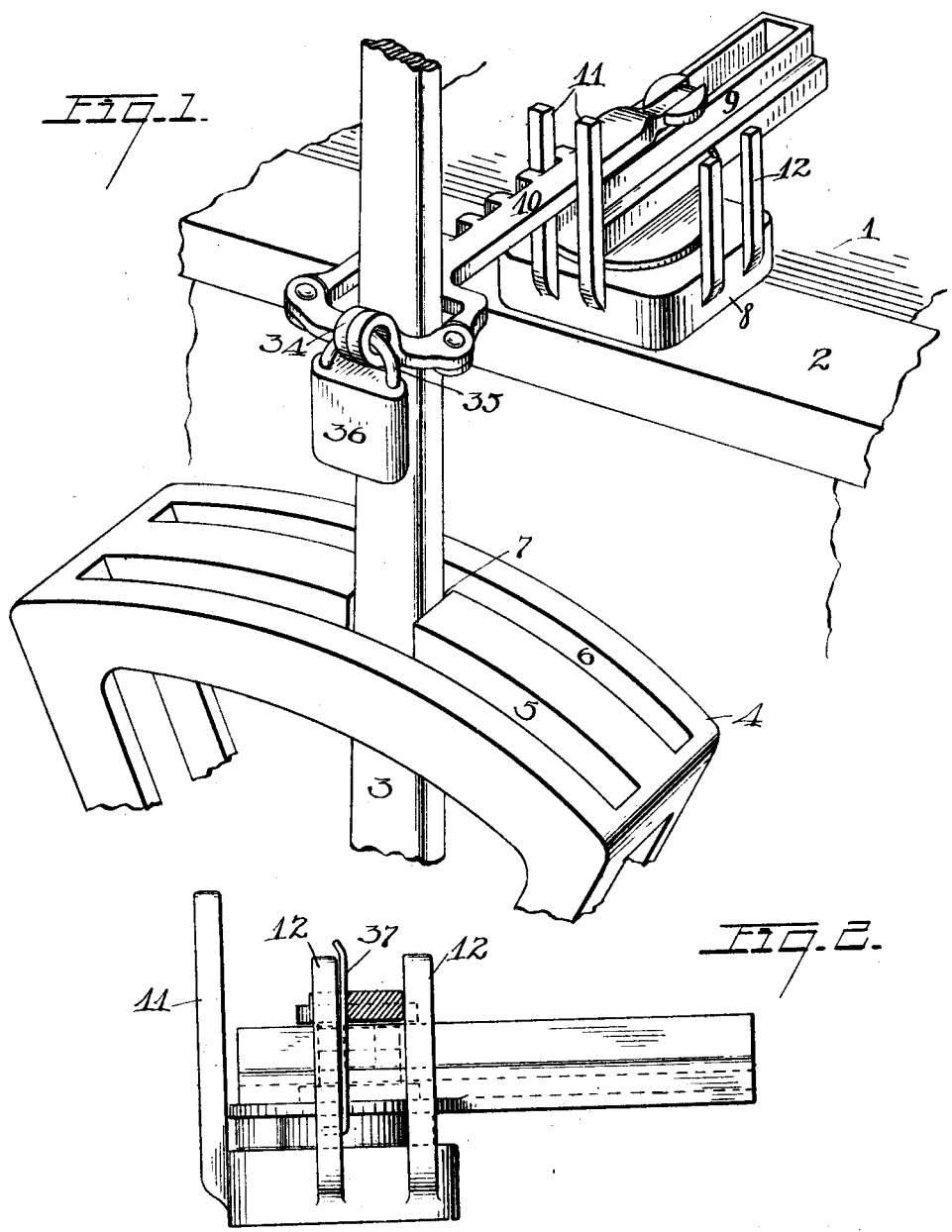

UNITED STATES PATENT OFFICE.

CHARLES R. SAUNDERS, OF CLEVELAND, OHIO.

LEVER-LOCK.

1,138,795.  Specification of Letters Patent.  Patented May 11, 1915.

Application filed December 23, 1909. Serial No. 534,668.

*To all whom it may concern:*

Be it known that I, CHARLES R. SAUNDERS, a citizen of the United States, residing at Cleveland, in the county of Cuyahoga and State of Ohio, have invented a certain new and useful Improvement in Lever-Locks, of which the following is a full, clear, and exact description, reference being had to the accompanying drawings.

This invention relates to locks, and more especially to a form of lock which is particularly well adapted for use with automobiles to lock the operating levers thereof in "dead" position.

The objects of this invention are generally to provide a lock of this kind which is comparatively economical of production, efficient in operation, and which is particularly well adapted for use with different makes of automobiles.

The invention may be defined further and generally as consisting of the combinations of elements embodied in the claims hereto annexed and illustrated in the drawings forming a part hereof, wherein—

Figure 1 represents a perspective view of a locking device constructed in accordance with my invention and illustrating the manner of applying the same to the operating lever of an automobile; Fig. 2 an elevation of the locking device showing its lever in the position which it occupies when not in use, the lever being shown in section; Fig. 3 represents a plan view of the locking device; and Fig. 4 a view, partly in section and partly in side elevation, of the locking device shown in Fig. 3.

The embodiment of my invention disclosed herein comprises generally a base which may be attached to any convenient part of an automobile, a track or guideway rotatably supported on said base, and a lever reciprocably supported by said track or guideway and swiveled thereto, the lever being provided with means whereby it may be attached to and detached from the operating lever for the automobile, with means whereby the lever may be retained in and out of operative relation to the operating lever.

Describing the parts by reference characters, 1 represents the bottom and 2 the wooden rail usually provided at the side entrance of an automobile.

3 represents the operating lever of the automobile and 4 the guide frame or quadrant for said lever. This guide frame is shown as located outside of the body proper of the automobile and is provided with two segmental slots 5 and 6 connected by a gate 7, as is usual. As is well known, when the operating lever is in the gate intermediate between the segmental slots 5 and 6, the engine shaft is disconnected from the drive shaft, the lever being in "dead" position.

A locking device constructed in accordance with my invention is shown as secured to the rail 2. This device comprises a base 8, a track or guideway 9 swiveled to said base, and a locking arm 10 adjustable along the track or guideway and rotatably supported with respect thereto, with means for retaining the locking arm in any desired position with reference to said track or guideway and a lock proper for securing the outer end of the locking arm to the operating lever. The base 8 is conveniently formed as an integral casting which is generally rectangular in shape and is provided with two pairs of upwardly projecting prongs 11 and 12, located about 90 degrees apart. The bottom of the base 8 is provided with a suitable bottom web 13 by means of which the base may be bolted or otherwise firmly secured to an appropriate portion of the automobile body. The base is provided with an upper web 14 having a circular opening 15. It also has formed therewith, surrounding the opening 15, an upwardly projecting wall 16 providing a circular bearing therewithin. For convenience of description, that portion of the base having the prongs 11 will be referred to as the "front." The wall 16 is thickened at the front of the base, for a purpose to be described hereinafter.

The guideway 9 consists generally of an elongated body, preferably an integral casting, having a bottom 17, rear end 18, and sides 19. A channel 20 is provided in each side above the bottom 17. The front of the guideway is open, for the purpose of applying and removing the swiveled locking arm thereto. Near its front end, the base is provided with a downwardly projecting circular boss 21, by means of which the guideway may be journaled within the wall 16.

22 denotes a connecting member having an enlarged base adapted to engage the under side of the web 14 and a central cylindrical projection 23 adapted to extend through the opening 15. By means of a screw 24, the guideway 17 may be connected to the member 22, thereby firmly and rotatably securing the guideway to the base. As the locking arm, to be described hereinafter, is itself swiveled to the guideway, it happens in many instances that there will be no occasion for rotating the guideway on the base. Hence the front end of the guideway may be secured to the thickened front of the wall 16, as by means of a screw 25.

The locking arm 10 has its rear end pivotally connected to the upper end of the swivel 26. This swivel is provided with a rounded base 27 which is adapted to project into the channels 20, the reduced body portion projecting upwardly between the sides of the guideway. The rear end of the locking arm 10 may be conveniently pivoted to the swivel by means of a rivet 28 extending through a slot 29 in the top of the swivel and through the rear end of the arm.

The locking arm is provided at one side with a plurality of spaced lugs 30 and is of such width that, when inserted between the prongs 11, it will be necessary for one of said prongs to project between a pair of these lugs in order to allow the arm to be raised and lowered between said prongs. These lugs are spaced a sufficient distance to enable the arm to be adjusted in a vertical plane and to be even disengaged from the prongs, as shown in dotted lines in Fig. 4. At its front or outer end, the arm is forked, as shown at 31, and each of the forks has pivoted thereto a finger 32. These fingers are adapted to be brought together to form with the forks 32 a closed space for the reception of the operating lever 3, and the outer end of each finger is provided with an aperture 33 formed in a projection 34. When the fingers are brought to closed position, these projections abut against each other and their apertures are adapted to receive the bow 35 of the padlock 36. The prongs 12 are preferably shorter than the prongs 11 and one of these prongs is provided with a spring 37 which has an outwardly bent portion 38 adapted to engage the locking arm 10 when inserted between said prongs and prevent the arm from being jarred or accidentally thrown out of place.

From the construction described and shown herein, the operation will be clear. The base 8 will be secured to a convenient portion of the body and the locking arm 10 will be adjusted along the guideway 9 so that its outer forked end and fingers may receive the operating lever when the latter is in the gate 7. As the location of the operating lever varies with different makes of automobiles, this adjustable feature of my locking device is of great importance, as it adapts my device for practically all makes of automobiles. When not in use, the arm 10 is folded upwardly until disengaged from the prongs 11 and is rotated, with the swivel 26, and inserted between the prongs 12, where it is retained by the spring 37 until it becomes necessary to again lock the operating lever.

Ordinarily it will not be necessary to rotate the guideway on the base. With certain makes of automobiles, however, the projecting rear end of the guideway may interfere with the removal of the bottom boards and especially with those boards by the removal of which access may be had to the parts operated by the foot lever. In such event, the screw 25 may be removed, and the guideway can then be rotated on the base and the locking arm be inserted between the prongs 12.

While I have shown my lock as applied to an operating lever located outside the body, it will be apparent that the base may be so positioned as to enable the locking arm to receive an operating lever which may be located within the body. It will be observed that the screws 24 and 25 are in a line extending from the pivot of the arm 10 to the space between the prongs 11. It follows that, when the arm 10 is connected to the operating lever 3, this arm will cover the screws 24 and 25, and access may not be had to either or both of said screws for the purpose of removing the guideway and locking arm from the base, which operation would permit an unauthorized person to move the operating lever into either of the segmental slots 5 and 6 and thus drive the automobile.

Having thus described my invention, what I claim is:—

1. In a device of the character set forth, the combination of a base having upwardly projecting prongs, and a locking member adjustably and pivotally supported from said base, and projecting between said prongs.

2. In a device of the character set forth, the combination of a base having an upwardly projecting pair of prongs, and a locking member adjustably supported from said base and pivoted to swing vertically between said prongs, said member having means adapted to engage the prongs in its various adjusted positions.

3. In a device of the character set forth, the combination of a base having a pair of upwardly projecting prongs, a locking member pivotally supported from said base, arms pivotally connected to the outer end of the locking member, and means for securing said arms together.

4. In a device of the character set forth, the combination of a base having two pairs of upwardly projecting prongs, and a locking member pivotally and rotatably supported by said base and adapted to be swung between said prongs.

5. In a device of the character set forth, the combination of a base having two pairs of upwardly projecting prongs, a locking member rotatably connected to said base and adapted to be inserted between either pair of prongs, and a spring co-acting with one pair of prongs and adapted to retain the member in place therebetween.

6. In a device of the character set forth, the combination of a base having a pair of prongs, a guideway pivotally connected to said base, an arm, a member mounted in said guideway to which said arm is pivoted, said member being rotatably supported in said guideway, projections carried by said arm, said projections being spaced to receive one of the prongs therebetween, and key operated securing means carried by said arm and serving to secure the same to a member whose movement is to be restrained.

7. In a device of the character set forth, the combination of a base having a vertical projection, a locking member adapted to swing vertically and adjustable toward and from said projection, and means whereby said member may engage said projection in its adjusted positions.

8. In a device of the character set forth, the combination of a base, a guideway, a pivotal connection between said guideway and said base, a body swiveled in said guideway, a locking member pivotally connected to said body and adjustable along said guideway, and means whereby said body and member may be retained in adjusted positions.

9. In a device of the character set forth, the combination of a base member having a web interposed between the top and bottom thereof, said web having an opening therethrough, a guideway pivotally mounted above said web, a locking member adjustable along said guideway, and a member having a flange beneath said web and a body projecting through the opening in said web and connected to said guideway.

10. In a device of the character set forth, the combination of a base, a guideway, means connecting said guideway to said base, a pair of prongs carried by said base, a member having a support adjustably mounted in said guideway, said member being adapted to cover the connection between the guideway and the base when inserted between said forks, and key operated securing means carried by said member and serving to secure the same to a member whose movement is to be restrained.

11. The combination, with a lever, of a base adapted to be attached to a suitable body fixed with relation to said lever, a guideway carried by said base, an arm, and a pivotal support for said arm mounted in said guideway, said arm being provided at its outer end with means adapted to engage the lever when the latter is in the position in which it is desired to be retained.

12. The combination, with a lever, of a base stationarily mounted adjacent thereto, a guideway carried by said base, an upwardly projecting arm also carried by said base, a locking member, and a pivotal support therefor mounted in said guideway, said member having means at its outer end adapted to engage the lever when the latter is in the position in which it is desired to be retained, and having means coöperating with said arm to retain the pivotal support in its various adjusted positions in the guideway.

13. In a lock mechanism for motor vehicles, the combination, with a pivoted lever adapted for controlling the movement of the vehicle, of a support adjacent to said lever, and a locking member pivotally mounted to said support at one side of the plane of movement of said lever and arranged to be brought into operative relation to said lever after said lever has been moved to "dead" position, the plane of movement of said locking member including the pivot of said lever.

14. In a lock mechanism for motor vehicles, the combination, with a pivoted controlling lever adapted for controlling the movement of the vehicle, of a base carried by said vehicle at one side of the plane of movement of said lever, a locking arm pivotally attached to said base and arranged to be brought into operative relation to said lever after the latter has been brought to inoperative position, and means for preventing said arm from being brought into operative relation to said lever at any time except after said arm or lever has been brought to off-position.

15. In a lock mechanism for motor vehicles, the combination, with a pivoted lever adapted for controlling the movement of the vehicle, of a support carried by said vehicle at one side of the plane of movement of said lever, and a locking arm pivoted to said support opposite to the off position of said lever, the pivot axis of the lever falling within the plane of movement of said arm, said arm and lever being arranged for interfitting engagement when the latter is in off-position and at no other time, and key operated locking mechanism for maintaining said arm in engagement with said lever.

16. In a lock mechanism for motor vehicles, the combination, with an arm or lever adapted for controlling the movements of a vehicle, of a second arm secured at one side of the plane of movement of said first arm or lever and arranged to swing in a plane intersecting the plane of movement of said first arm or lever, the plane of movement of said second lever including the pivot of said first lever, means operative after said first arm or lever has been brought to a predetermined position for locking said second arm in engagement therewith, and means preventing said second arm from being secured to said first arm or lever when the latter is in any other position of adjustment.

17. In a device of the character set forth, the combination, with the controlling lever of a self-propelled vehicle, of a securing arm pivoted to said vehicle at a distance from said lever and arranged to be swung into the path of movement of the same, said arm having adjacent to its free end a pair of spaced integral branches adapted to receive said lever between them when the same is in one position of its adjustment, and means including a padlock adapted to connect together the ends of said branches and to embrace said lever.

18. In a device of the character described, the combination, with the controlling lever of a self-propelled vehicle and a fixed base located at a distance therefrom, of a securing arm swingingly attached to said base and arranged to be swung so as to intersect the path of movement of said lever, the free end of said arm having a pair of spaced integral branches adapted to receive said lever between them when the same is in one position of its adjustment, one of said branches having a link pivoted to the end thereof and means including a padlock adapted to connect the end of said link with the end of the other branch.

In testimony whereof, I hereunto affix my signature in the presence of two witnesses.

CHARLES R. SAUNDERS.

Witnesses:
J. B. HULL,
BRENNAN B. WEST.